United States Patent
Zhang et al.

(10) Patent No.: US 12,530,134 B2
(45) Date of Patent: Jan. 20, 2026

(54) ADAPTIVE METHOD TO EFFICIENTLY READ OUT RETENTION DEGRADED NAND DATA

(71) Applicant: Lenovo (Singapore) Pte. Ltd., Singapore (SG)

(72) Inventors: Tingting Zhang, Kanagawa (JP); Takashi Sugawara, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/768,511

(22) Filed: Jul. 10, 2024

(65) Prior Publication Data

US 2026/0016969 A1 Jan. 15, 2026

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS

| | | | |
|---|---|---|---|
| 2020/0250061 A1* | 8/2020 | Lee | G06F 11/1044 |
| 2022/0171566 A1* | 6/2022 | Kim | G11C 16/349 |
| 2024/0160357 A1* | 5/2024 | Jang | G06F 3/0659 |
| 2024/0233813 A1* | 7/2024 | Guo | G11C 11/4096 |

* cited by examiner

*Primary Examiner* — Hiep T Nguyen
(74) *Attorney, Agent, or Firm* — Osha Bergman Watanabe & Burton LLP

(57) ABSTRACT

A method of operating a computing device with a solid state drive (SSD) includes: obtaining a preexisting read retry table that includes a sequential list of voltage index sets for reading a flash memory of the SSD; determining an aging parameter of the SSD; identifying a retry voltage index set from the sequential list based on the aging parameter; and reading the flash memory using the retry voltage index set.

15 Claims, 8 Drawing Sheets

ADAPTIVE METHOD TO EFFICIENTLY READ OUT RETENTION DEGRADED NAND DATA

TECHNICAL FIELD

The present disclosure relates to a method of controlling a computing device with a solid state drive (SSD) that includes flash memory.

BACKGROUND

Flash memory of an SSD (e.g., NAND or NOR based memory devices) provides improved read and write speeds compared to hard disk drives in computing devices. However, similar to any other type of storage medium, stored information in flash memory may be corrupted by degradation. One mechanism of degradation in the flash memory is charge loss that causes readout from the flash memory to produce bit read errors. Efficient methods of compensating for charge loss required to ensure accurate memory readout and to maintain full utility of the flash memory.

SUMMARY

In general, one or more embodiments of the invention relate to a method of operating a computing device with a solid state drive (SSD). The method includes: obtaining a preexisting read retry table that includes a sequential list of voltage index sets for reading a flash memory of the SSD; determining an aging parameter of the SSD; identifying a retry voltage index set from the sequential list based on the aging parameter; and reading the flash memory using the retry voltage index set.

In general, one or more embodiments of the invention relate to a non-transitory computer readable medium (CRM) storing computer readable program code for operating a computing device with a SSD. The computer readable program code causes the computing device to: obtain a preexisting read retry table that includes a sequential list of voltage index sets for reading a flash memory of the SSD; determine an aging parameter of the SSD; identify a retry voltage index set from the sequential list based on the aging parameter; and read the flash memory using the retry voltage index set.

In general, one or more embodiments of the invention relate to a computer device comprising: a solid state drive (SSD) including a flash memory; and a processor configured to read the flash memory. The processor is configured to: obtain a preexisting read retry table that includes a sequential list of voltage index sets for reading the flash memory; determine an aging parameter of the SSD; identify a retry voltage index set from the sequential list based on the aging parameter; and read the flash memory using the retry voltage index.

Other aspects of the invention will be apparent from the following description and the appended claims.

DETAILED DESCRIPTION

Figure 1A:
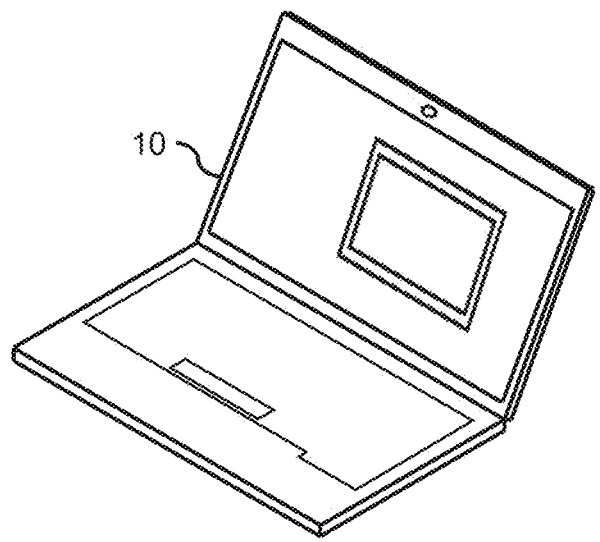
FIG. 1A shows a perspective view of a computing device in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

To counteract readout degradation and maintain functionality of the SSD, a conventional solution employs an read retry process with iterative voltage settings to reread any portion of the flash memory containing bit read errors. As described in further detail below, embodiments of the present invention improve the read retry process with one or more (i.e., a pattern of) adaptive read retry voltage index sets that increasing the speed and efficiency of the read retry process.

FIG. 1A shows a perspective view of a computing device 10 in accordance with one or more embodiments of the invention.

The computing device 10 (e.g., laptop personal computer (PC), tablet PC, desktop PC, convertible PC) is equipped with at least one SSD. Embodiments of the invention may be implemented on virtually any type of computing device 10, regardless of the platform being used. For example, the computing device 10 may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 1B:
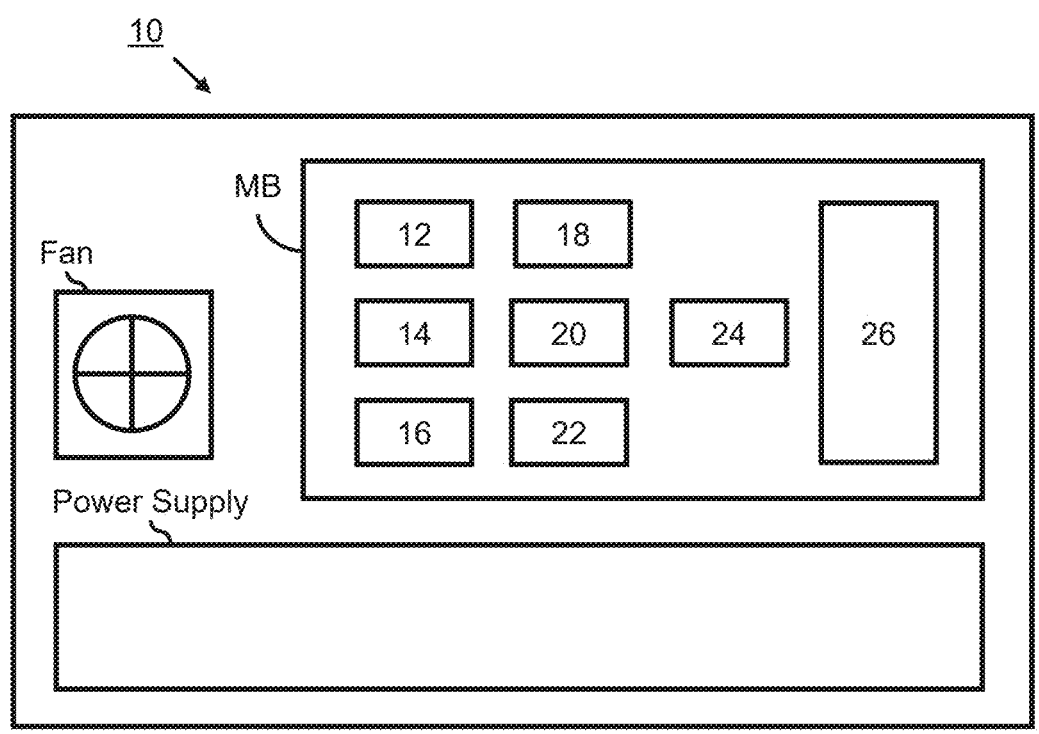
FIG. 1B shows a schematic of various subcomponents of the computing device of FIG. 1A in accordance with one or more embodiments of the invention.

FIG. 1B shows a schematic of various subcomponents of the computing device 10 of FIG. 1A in accordance with one or more embodiments of the invention.

The computing device 10 includes a motherboard MB with a plurality of subcomponents. The subcomponents installed on the motherboard MB may include a central processing unit (CPU) 12, a memory 14, a graphics processing unit (GPU) 16 (e.g., a video subsystem), a chipset 18, a firmware memory 20, an embedded controller 22, a power control circuit 24, and a storage device 26 (e.g., hard disk drive (HDD), a solid state drive (SSD)). The computing device 10 may further include a fan and a power supply.

In one or more embodiments, the above subcomponents of the computing device 10 may be omitted, included in multiple quantities, combined as a single subcomponent (e.g., a processor that acts as a controller of one or more subcomponents), and/or disposed in other portions of the computing device 10. For example, the SSD described herein may be an individual component, an embedded component (e.g., a portion of a storage device 26), any combination of the above, or any appropriate implementation in the configuration of the computing device 10.

In addition, it will be appreciated that other subcomponents (e.g., peripheral devices, removeable components, external power supplies) beyond those listed above may be included, internally or externally, as a subcomponent of the computing device 10 without departing from the scope of the present disclosure. For example, while the following embodiments are described with respect to an internal SSD, the invention may be directed to any type of SSD connected to the computing device 10 (e.g., an external SSD).

As discussed above, embodiments of the invention may be implemented on virtually any type of computing device 10. For example, the computing device 10 may include one or more computer processor(s), associated memory (e.g., random access memory (RAM), cache memory, flash memory), one or more storage device(s), and numerous other elements and functionalities. The computer processor(s) may be an integrated circuit for processing instructions. For example, the computer processor(s) may be one or more cores, or micro-cores of a processor. The computing device 10 may also include one or more input device(s), a camera, a touchscreen, a keyboard, a mouse, a microphone, a touchpad, an electronic pen, or any other type of input device. Further, the computing device 10 may include one or more output device(s), such as a projector, display screen (e.g., an OLED display or other pixel addressable display device), an external storage, or any other output device. One or more of the output device(s) may be the same or different from the input device(s). The computing device 10 may be connected to a network (e.g., a local area network (LAN), a wide area network (WAN) such as the Internet, mobile network, or any other type of network) via a network interface connection (not shown). The input and output device(s) may be locally or remotely (e.g., via the network) connected to the computer processor(s), memory, and storage device(s). Many different types of computing device 10 exist, and the aforementioned subcomponents of the computing device 10 may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Figure 1C:
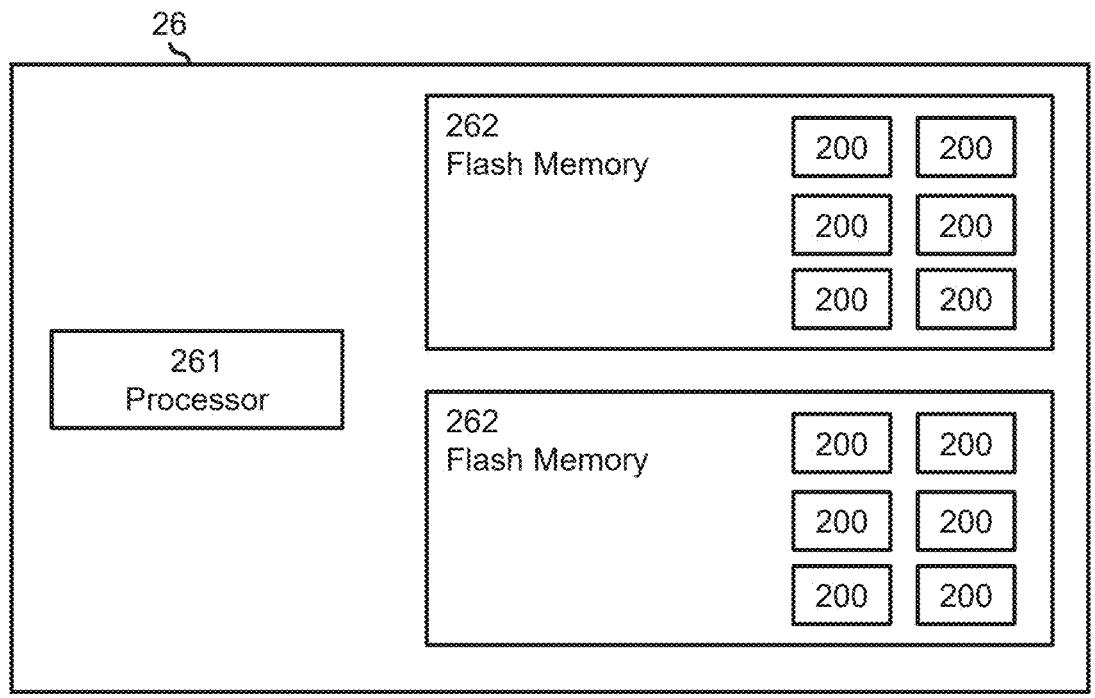
FIG. 1C shows a schematic of subcomponents of a SSD of the computing device of FIG. 1A in accordance with one or more embodiments of the invention.

FIG. 1C shows a schematic of subcomponents of a SSD of the computing device 10 of FIG. 1A in accordance with one or more embodiments of the invention.

In one or more embodiments, the storage device 26 is an SSD that includes a processor 261 (e.g., a controller) and one or more units of flash memory 262 (i.e., flash memory device(s)). Each flash memory 262 includes a plurality of flash memory cells 200 (e.g., NAND device, NOR device), which are described in further detail below with respect to FIG. 2A. For example, a flash memory device 262 may be organized into pages and/or blocks of flash memory cells 200.

The processor 261 controls reading from and writing to the flash memory 262. In one or more embodiments, another processor (e.g., a CPU processor 12, GPU processor 16, an integrated circuit, a remote processing device) of the computing device 10 may control reading from and writing to the flash memory 262. The SSD may further include a firmware that is used by the processor 261 to read from and write to the flash memory 262.

Figure 2A:
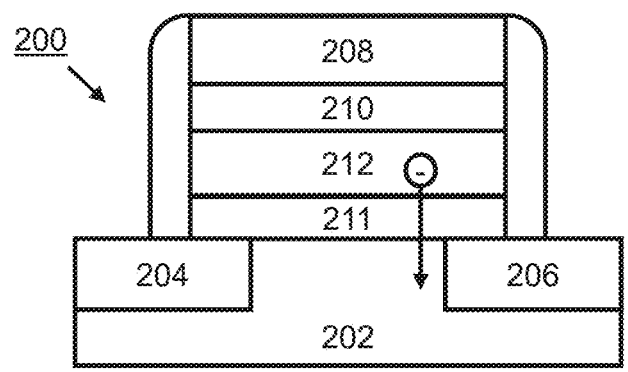
FIG. 2A shows a schematic of a flash memory cell of a SSD.

FIG. 2A shows a schematic of a flash memory cell 200 of a SSD.

A SSD includes a plurality of flash memory cells 200 to retain information. Each flash memory cell 200 includes a substrate 202 with a source 204 and a drain 206. A control gate 208 is used to control charge carriers in a storage layer 212 (e.g., a charge trap, a floating gate). A gate oxide film 210 and a tunnel oxide film 211 isolate the storage layer 212 from the control gate 208 and the substrate 202, respectively.

The data retention capability of the flash memory cell 200 can degrade as the flash memory cell 200 ages. One mechanism of degradation is charge loss of the storage layer 212 through the tunnel oxide film 211 over time. Charge loss can be affected by various parameters such as the number of program/erase cycles of the flash memory cell 200, a temperature of the SSD, and/or time of operation (e.g., time elapsed from powerup). Over time, as more electrons in a floating gate or a charge trap leak through the tunnel oxide film 211, the amount of charge remaining in the floating gate or charge trap is reduced. As a result, the voltage thresholds used to correctly read the flash memory cell 200 need to shift from the original values, as shown in FIG. 2B.

Figure 2B:
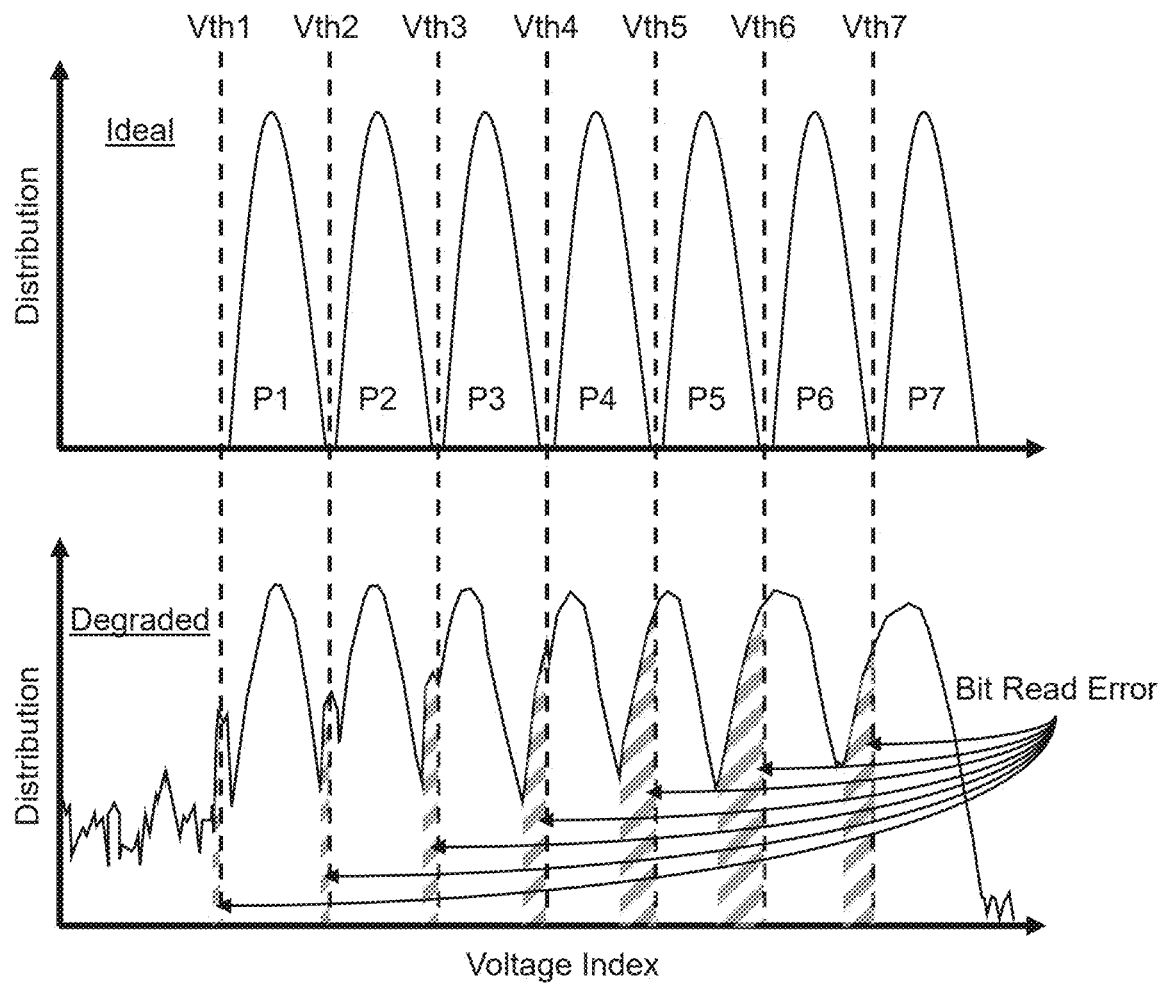
FIG. 2B shows a diagram of typical and degraded readout from the flash memory.

FIG. 2B shows diagrams of ideal and degraded readout from the flash memory cell 200.

In the top diagram FIG. 2B, an ideal readout includes a plurality of program states P (e.g., bit sequences) that are perfectly differentiated by a plurality of voltage thresholds Vth (i.e., voltage index sets). In other words, a voltage readout from the flash memory 262 can be compared to the voltage index set to determine the program state or stored value of the flash memory 262.

In the bottom diagram of FIG. 2B, charge loss in the flash memory 262 results in degraded readout and bit read errors. Due to the loss of charge in the storage layer 212, the readout from the flash memory 262 shifts/condenses to the left and causes the distribution for a given program state to cross the original voltage thresholds. Any lower portion of the distribution for each program state that crosses an original voltage threshold level is misread as the adjacent program state. A firmware of the SSD may execute a read retry process to attempt rereading the intended program state of the flash memory 262 by compensating for the change in the voltage readout.

Figure 2C:
FIG. 2C shows a preexisting read retry table for reading the flash memory.

FIG. 2C shows a preexisting read retry table 250 for reading the flash memory 262.

A conventional read retry process uses a read retry table 250 that includes a pre-defined sequential list of voltage index sets for reading the flash memory 262. To adapt to the change in the voltage readout, each voltage index set establishes a new set of thresholds to differentiate between the expected program states. As shown in FIG. 2C, a conventional read retry table 250 may include dozens of individual voltage index sets (i.e., each row of the read retry table). The firmware of the SSD sequentially uses each voltage index set of the read retry table 250 to reread the flash memory 262 until bit read errors are resolved. However, this conventional approach may take too long to complete before the original bit read error causes a problem for the computing device 10 (e.g., application/operating system hangup, "blue screen of death").

As described in further detail below, embodiments of the present invention improve upon the conventional read retry process with one or more (i.e., a pattern of) adaptive read retry voltage index sets that increasing the speed and efficiency of the read retry process. In one or more embodiments, an aging parameter of the SSD is determined to characterize the amount of degradation in the flash memory. Based on the aging parameter, an appropriate voltage index set may be selected from the conventional read retry table 250 to read the flash memory 262 without long iterative processing.

Figure 3A:
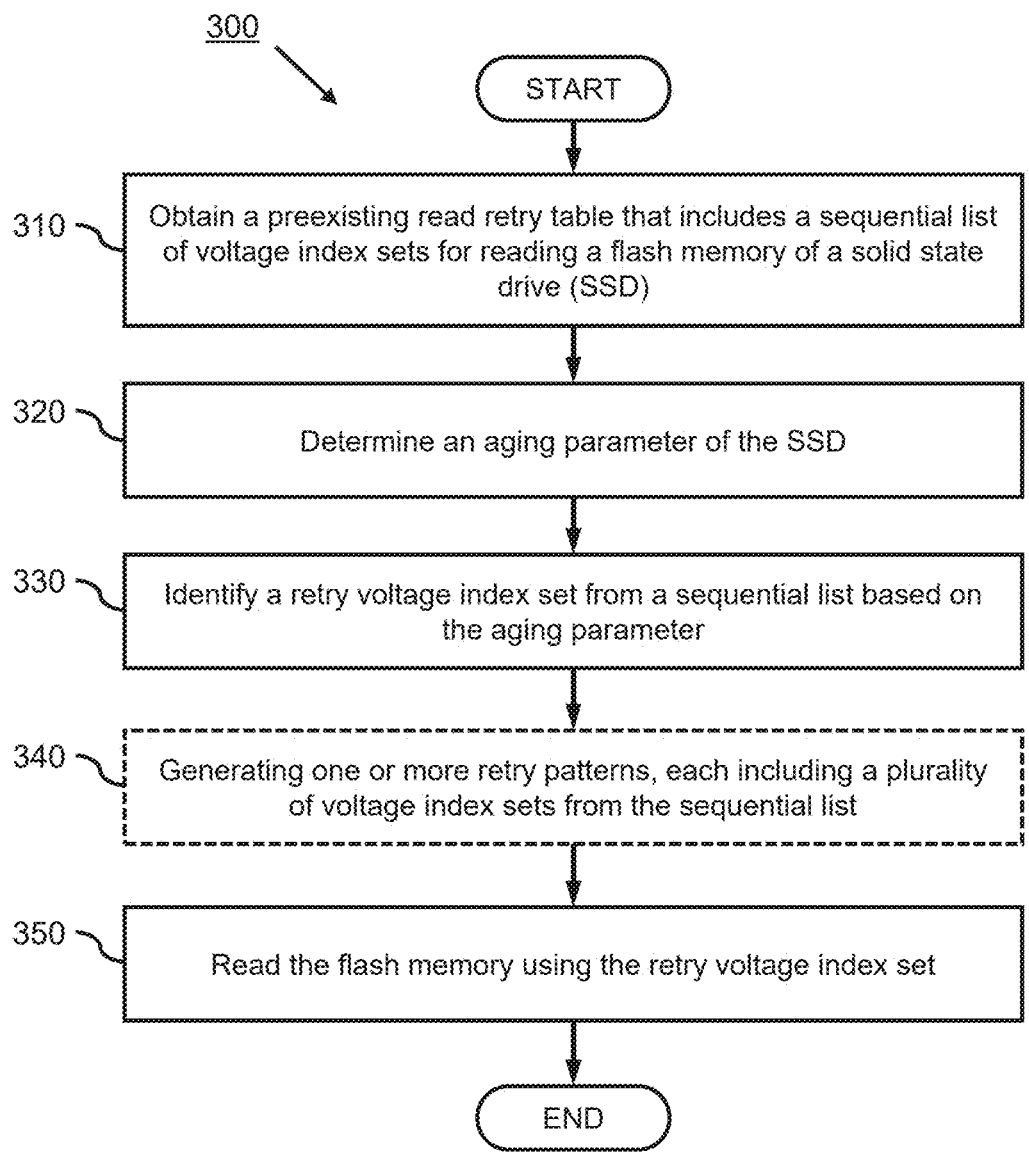
FIGS. 3A-3B show flowcharts of a method in accordance with one or more embodiments of the invention.

FIG. 3A shows a flowchart of a method 300 in accordance with one or more embodiments of the invention.

At 310, a processor (e.g., processor 261 of the SSD, processor 12 of the computing device 10, any processor connected to the SSD) obtains a preexisting read retry table 250 that includes a sequential list of voltage index sets for reading the flash memory 262. The preexisting read retry table 250 may be stored in a memory of the firmware of the SSD.

At 320, the processor determines an aging parameter of the SSD. As described in further detail below with respect to FIG. 3B, the aging parameter may be determined using a variety of different methods.

At 330, the processor identifies a retry voltage index set from the sequential list in the preexisting read retry table 250 based on the aging parameter.

Optionally, at 340, the processor generates one or more retry patterns. Each retry pattern includes a plurality of voltage index sets, identified from the sequential list, based on one or more aging parameters. A retry pattern defines a set of retry voltage index sets from the sequential list that can be sequentially used in reread operations without having to determine a new retry voltage index set after each failure.

In some embodiments, each entry (i.e., voltage index set) in the retry pattern corresponds to a different element of an aging parameter (e.g., one entry corresponding to an aging parameter based on P/E cycles, another entry corresponding to an aging parameter based on temperature) or a different aging parameter. In some embodiments, a retry pattern may be sequentially listed based on an importance of the corresponding aging parameters. A retry pattern may include the retry voltage index set identified at 330 as the first sequential entry of the first retry pattern.

In one or more embodiments, the processor may generate a predetermined number of retry patterns. A set of retry patterns can be sequentially used in reread operations without having to determine a new retry pattern after each failure. In some embodiments, the predetermined number of retry patterns may be sequentially listed based on an importance of aging parameters used to generate the respective retry patterns.

At 350, the processor reads the flash memory using the retry voltage index set on the SSD. In embodiments with a retry pattern, the processor may sequential use the entries of the retry pattern (e.g., starting with the retry voltage index set identified at 330). In embodiments with a plurality of retry patterns, the processor may sequential use the list of retry patterns (e.g., starting with a first retry pattern generated at 340).

Figure 3B:
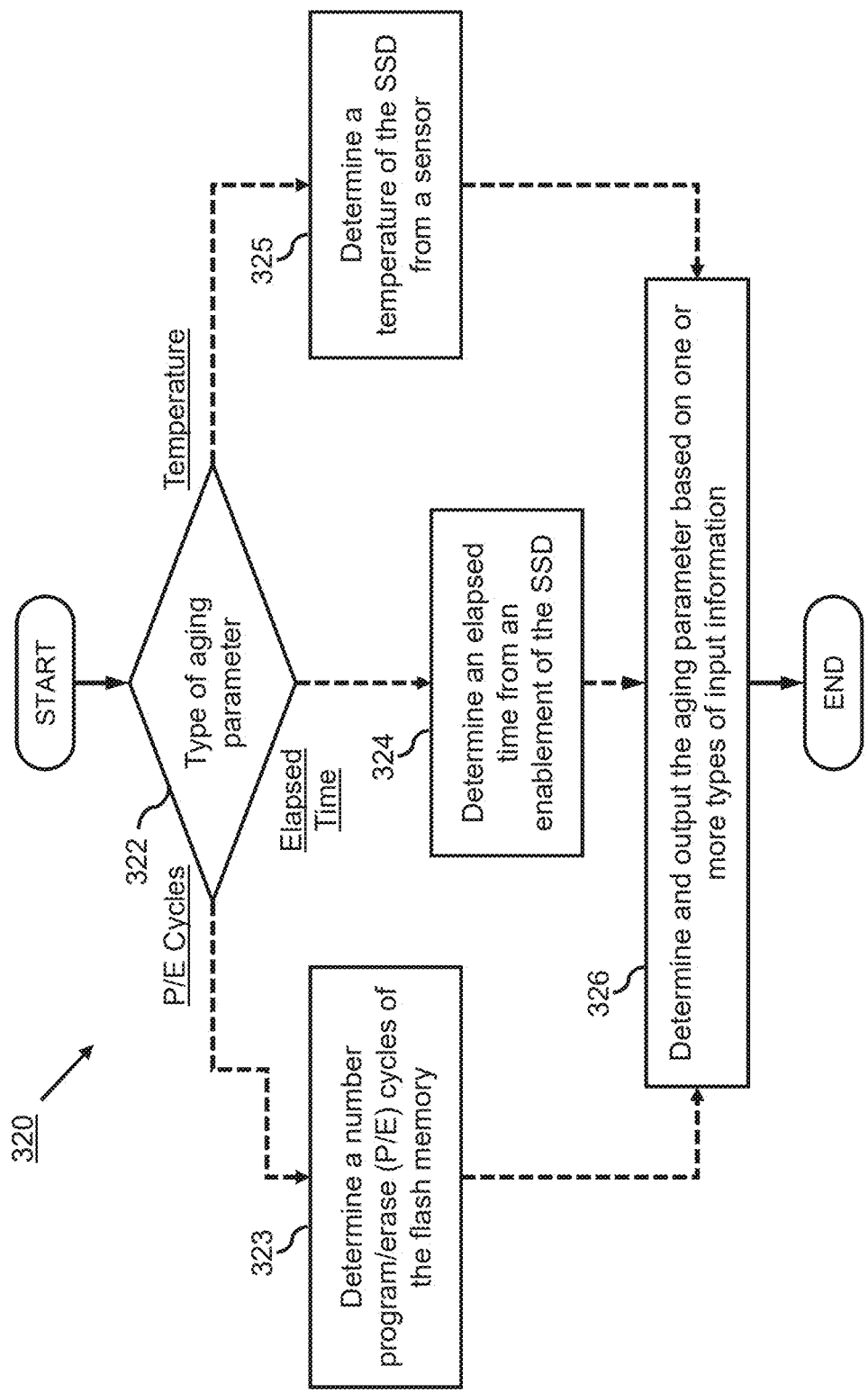

FIG. 3B shows a flowchart of a method 320 in accordance with one or more embodiments of the invention. As discussed above, the method 320 involves determining an aging parameter of the SSD.

At 322, the processor identifies a type of aging parameter to determine. As discussed above, the aging of the SSD (or one or more flash memory devices 262 or one or more flash memory cells 200 therein) may be characterized by several parameters. For example, the number of program/erase (P/E) cycles of the flash memory device 262 or the flash memory cell 200 may correlate to the amount of degradation. Similarly, the ambient temperature and/or elapsed operational time may correlate to the amount of degradation.

Under different operating conditions of the computing device 10, one aging parameter may provide a more accurate characterization of the amount of degradation. For example, under consistent usage, elapsed operational time may provide an accurate estimate of degradation. However, when usage greatly varies in time or intensity, a direct measurement of P/E cycles may provide a more accurate estimate of degradation.

When the processor identifies P/E cycles as the aging parameter to determine at 322, the process continues to 323.

When the processor identifies elapsed time as the aging parameter to determine at 322, the process continues to 324.

When the processor identifies temperature as the aging parameter to determine at 322, the process continues to 325.

At 323, the processor determines a number P/E cycles of the flash memory 262. The number of P/E cycles may be determined based on a specific portion of the flash memory 262 being read (e.g., a flash memory device 262, a page, a block of the flash memory 262, a flash memory cell 200). Alternatively, the number of P/E cycles may be statistical approximation (e.g., an average, a mean, a median, a mode) of one or more or all portions of the SSD.

At 324, the processor determines an elapsed time from an enablement of the SSD. The elapsed time may be a measurement of an operational time for a specific portion of the SSD being read (e.g., a flash memory device 262, a page or a block of the flash memory device 262, a flash memory cell 200) or the SSD as a whole.

In one or more embodiments, the processor obtains, from a basic input/output system (BIOS) of the computing device 10, a Non-Volatile Memory Express (NVME) timestamp. Based on the NVMe timestamp (e.g., Feature Identifier 0Eh), the processor may calculate the elapsed operational time (e.g., of the SSD, the flash memory device 262, a page or a block of the flash memory device 262, a flash memory cell 200) by counting the elapse time after a host enables it.

At 325, the processor determines a temperature of the SSD from a sensor. The sensor may be thermometer (e.g., thermocouple) incorporated into the SSD or disposed on or adjacent to the SSD. In some embodiments, the sensor may be disposed in the computing device 10 within a distance of the SSD to estimate the temperature of the SSD.

At 326, the processor determines and outputs the aging parameter based on one or more types of input information determined at 323-325. An aging parameter may take many forms.

In some embodiments, the aging parameter is an index value (e.g., a row number/label) of the preexisting read retry table that is determined by based on information obtained at 323-325. The information obtained at 323-325 may be transformed by one or more algorithms, equations, associations, transforms, logic trees, etc., into the aging parameter. For example, multiplying an elapsed time determined at 324 with a probability of increased degradation per time unit can generate an estimate of the amount of degradation. The amount of degradation may be associated with one or more rows of the preexisting read retry table 250, the one or more indices of which are output as the aging parameter.

In some embodiments, the aging parameter is based on multiple types of input information obtained at 323-325 (e.g., the method 320 may include multiple iterations of 323-325 executed in series or in parallel). For example, the temperature determined at 325 may be used in combination with a number of P/E cycles determined at 323 to determine the aging parameter. When degradation due to P/E cycles is temperature dependent, including both types of input information from 323 and 325 can more accurately estimate the amount of degradation and provide a more appropriate aging parameter.

In some embodiments, the aging parameter includes multiple entries (e.g., multiple index values of the preexisting read retry table, each based on one or more measurements). As discussed above, the processor may utilize one or more types of information determined at 323-325 to determine a set of estimates for the amount of degradation. Accordingly, the aging parameter may include multiple entries (e.g., individual indices of the preexisting read retry table 250) based on each type of information and/or different combinations of types of information. As discussed in further detail below with respect to FIG. 4, in some embodiments, the multiple entries may be used to generate a retry pattern that includes a plurality of voltage index sets (e.g., corresponding to the multiple entries of the aging parameter).

In some embodiments, the aging parameter includes a direct measurement value from the information obtained at 323-325 (e.g., a number of P/E cycles, an elapsed time, a temperature) instead of a corresponding index value of the preexisting read retry table 250. The direct measurement value may be transformed into the corresponding index value of the preexisting read retry table 250 at a later time (e.g., at 350, in the process of reading the SSD).

One or more of the individual processes shown in the flowcharts of FIGS. 3A-3B may be omitted, repeated, combined, and/or performed in a different order (e.g., parallelized) than the order shown in this disclosure. For example, the "END" of a method may connect directly to the "START" to execute the method in a loop. Alternatively, or in addition, one or more processes may be combined in one or more embodiments.

Each process may be implemented by hardware (e.g., circuitry, physical components), software (e.g., machine code, programming on non-transitory computer readable media), or any combination thereof. The processes may be performed actively or passively. For example, some steps may be performed using at intervals, based on polling, and/or may be event/interrupt driven in accordance with one or more embodiments of the invention. Additional processes may be performed. Accordingly, the scope of the invention should not be limited by the specific arrangement as depicted in FIGS. 3A-3B.

Figure 4:
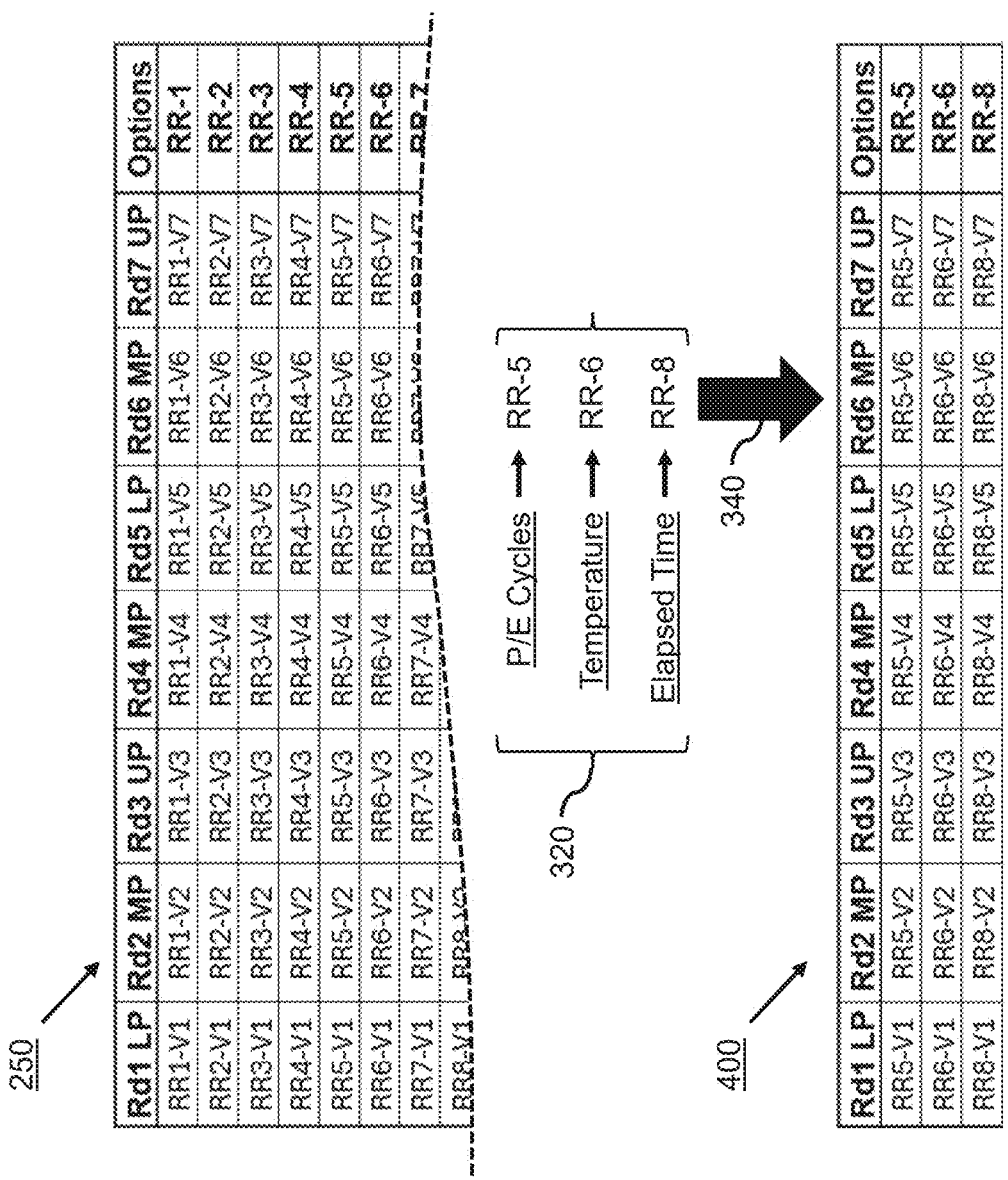
FIG. 4 shows an example of generating a retry pattern in accordance with one or more embodiments.

FIG. 4 shows an example of generating a retry pattern in accordance with one or more embodiments.

In the following non-limiting example, a preexisting read retry table 250 includes a pre-defined sequential list of voltage index sets for reading the flash memory 262. The conventional read retry methodology would iterate through the voltage index sets in the sequential list (i.e., attempt RR-1, followed by RR-2, RR-3, and so on).

In one or more embodiments, the computing device 10 performs a series of determinations for the number of P/E cycles, temperature, and elapsed time, according to 323-325 described above. Each of the determinations is associated with a corresponding index of the preexisting read retry table 250. In this non-limiting example, the number of P/E cycles indicates a level of degradation that may be compensated for by using the voltage index set labeled RR-5, the temperature indicates a level of degradation that may be compensated for by using the voltage index set labeled RR-6, the elapsed time indicates a level of degradation that may be compensated for by using the voltage index set labeled RR-8. In other words, the aging parameter may be the list (RR-5, RR-6, RR-8). Alternatively, the aging parameter may be a list of the corresponding measurements.

In some embodiments, the computing device 10 may generate retry pattern 400 based on the aging parameter. In this non-limiting example, the retry pattern includes a first retry voltage index set, a second retry voltage index set, and a third retry voltage index set, corresponding to RR-5, RR-6, and RR-8 of the preexisting read retry table 250, respectively. Accordingly, the read retry methodology according to one or more embodiments of the present invention would iterate through the voltage index sets in the retry pattern 400 (i.e., attempt RR-5, followed by RR-6, followed by RR-8).

A retry pattern 400 may be an ordered list based on a priority of the metrics used to determine the one or more aging parameters. For example, the first sequential entry of a retry pattern may be is selected based on a number program/erase (P/E) cycles of the flash memory 262 because the P/E cycles may be the most important consideration for estimating degradation. A second sequential entry of the retry pattern may selected based on a temperature of the SSD or an elapsed operational time of the SSD, depending on which metric is more important to estimating degradation. Information regarding a relative level of importance may be determined when the aging parameters are determined, may be predefined, or determined at any appropriate time (e.g., upon bootup, restart, start of an application, start of a processing procedure, change in hardware and/or software configuration).

Figure 5:
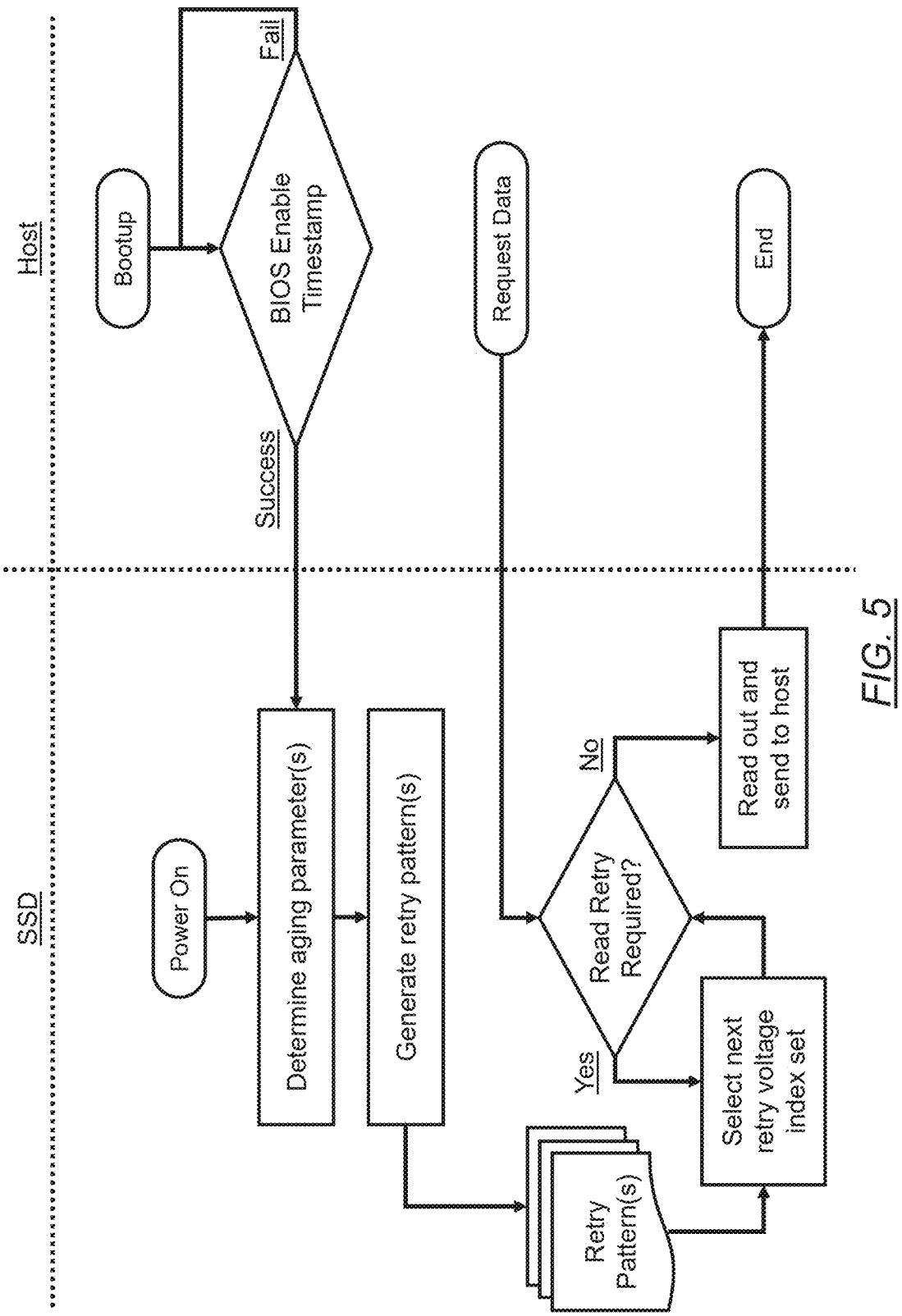
FIG. 5 shows a non-limiting example of a read retry process workflow in accordance with one or more embodiments.

FIG. 5 shows a non-limiting example of a read retry process workflow in accordance with one or more embodiments.

Initially, a host of a computing device initializes a bootup process and causes a BIOS of the computing device to enable a timestamp (e.g., a NVMe timestamp). When the enablement process fails, the BIOS reattempts enabling of the timestamp until successful enablement of the timestamp.

In one or more embodiments, upon powering up of the SSD (e.g., during bootup of the computing device, upon installation of an external SSD), one or more aging parameters of the SSD are determined. Alternatively, the one or more aging parameters may be determined in response to execution of a predetermined process of the computing device (e.g., bootup, restart, start of an application, start of a processing procedure, change in hardware and/or software configuration).

Based on the one or more aging parameters, one or more retry patterns are generated. In some embodiments, this may include identifying a single retry voltage index set from a preexisting read retry table (e.g., a retry pattern including a single entry). In some embodiments, one or more of the retry patterns include a plurality of entries based on a different aging parameter of the SSD (e.g., a different measurement or element in an aging parameter), as described above with respect to FIG. 4. The one or more retry patterns may be stored in a memory of the SSD (e.g., in the firmware) or in a memory of the computing device 10.

When the host requests data from the SSD, it is determined whether or not a read retry process is required (e.g., detecting bit read errors). If the read retry process is not required, read out of the SSD occurs and the data is sent to the host. When the read retry process is required, a retry voltage index set is selected from the one or more retry patterns to attempt rereading the data. If the first reread attempt fails (i.e., using the first retry voltage index set fails to produce data without bit read errors), the next retry voltage index set is selected and used to attempt rereading the data until successful readout of the SSD.

While this description includes a limited number of examples for the aging parameter, it will be appreciated that any appropriate metric may be used as an aging parameter or to determine an aging parameter. Accordingly, embodiments of the present invention should not be limited to the above non-limiting examples.

One or more of the embodiments of the invention may have one or more of the following improvements to computing devices: quick flash memory data read out speed; Reduce use of computational resources (processing attempts) during read retry process; improve consumer functionality by preventing unexpected errors during read retry process (e.g., application/operating system timeout, "blue screen of death").

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of operating a computing device with a solid state drive (SSD), the method comprising:
   obtaining a preexisting read retry table that includes a sequential list of voltage index sets for reading a flash memory of the SSD;
   determining an aging parameter of the SSD;
   identifying a retry voltage index set from the sequential list based on the aging parameter;
   reading the flash memory using the retry voltage index set; and
   generating a first retry pattern including a plurality of voltage index sets from the sequential list,
   wherein a first sequential entry of the first retry pattern is the retry voltage index set, and
   wherein reading the flash memory uses sequential entries of the first retry pattern, starting with the retry voltage index set.

2. The method of claim 1, further comprising:
   determining a number program/erase (P/E) cycles of the flash memory,
   wherein the aging parameter is based on the number program/erase (P/E) cycles of the flash memory.

3. The method of claim 2,
   wherein the number of P/E cycles is determined based on a page or a block of the flash memory or a flash memory cell of the flash memory.

4. The method of claim 1, further comprising:
   determining an elapsed time from an enablement of the SSD,
   wherein the aging parameter is based on the elapsed time at the SSD, the flash memory, a page or a block of the flash memory, or a flash memory cell of the flash memory.

5. The method of claim 4, further comprising:
   obtaining, from a basic input/output system of the computing device, a Non-Volatile Memory Express timestamp; and
   calculating the elapsed time.

6. The method of claim 1, further comprising:
   determining a temperature of the SSD from a sensor,
   wherein the aging parameter is based on the temperature.

7. The method of claim 1,
   wherein each entry of the first retry pattern is based on a different aging parameter of the SSD.

8. The method of claim 7,
   wherein the first sequential entry of the first retry pattern is selected based on a number program/erase (P/E) cycles of the flash memory.

9. The method of claim 8,
   wherein a second sequential entry of the first retry pattern is selected based on a temperature of the SSD.

10. The method of claim 8,
    wherein a second sequential entry of the first retry pattern is selected based on an elapsed time from enablement of the SSD.

11. The method of claim 1, further comprising:
    generating a predetermined number of retry patterns, including the first retry pattern,
    wherein each retry pattern includes a plurality of voltage index sets from the sequential list,
    wherein reading the flash memory sequentially uses the predetermined number of retry patterns, starting with the first retry pattern.

12. The method of claim 1,
    wherein the first retry pattern is generated in response to execution of a predetermined process of the computing device.

13. The method of claim 12,
    wherein the predetermined process is bootup of the computing device.

14. A non-transitory computer readable medium (CRM) storing computer readable program code for operating a computing device with a solid state drive (SSD), the computer readable program code causes the computing device to:
    obtain a preexisting read retry table that includes a sequential list of voltage index sets for reading a flash memory of the SSD;
    determine an aging parameter of the SSD;
    identify a retry voltage index set from the sequential list based on the aging parameter;
    read the flash memory using the retry voltage index set; and
    generate a first retry pattern including a plurality of voltage index sets from the sequential list,
    wherein a first sequential entry of the first retry pattern is the retry voltage index set, and
    wherein reading the flash memory uses sequential entries of the first retry pattern, starting with the retry voltage index set.

15. A computing device comprising:
    a solid state drive (SSD) including a flash memory; and
    a processor configured to read the flash memory,
    wherein the processor is configured to:
       obtain a preexisting read retry table that includes a sequential list of voltage index sets for reading the flash memory;
       determine an aging parameter of the SSD;
       identify a retry voltage index set from the sequential list based on the aging parameter;

read the flash memory using the retry voltage index set; and generate a first retry pattern including a plurality of voltage index sets from the sequential list, wherein a first sequential entry of the first retry pattern is the retry voltage index set, and wherein reading the flash memory uses sequential entries of the first retry pattern, starting with the retry voltage index set.

\* \* \* \* \*